US006281999B1

United States Patent
Watson et al.

(10) Patent No.: US 6,281,999 B1
(45) Date of Patent: Aug. 28, 2001

(54) OPTICS SYSTEM FOR INFRARED SIGNAL TRANSCEIVERS

(75) Inventors: Michael R. Watson; T. Allan Hamilton, both of San Jose, CA (US)

(73) Assignee: Zilog, Inc., Campbell, CA (US)

( * ) Notice: Subject to any disclaimer, the term of this patent is extended or adjusted under 35 U.S.C. 154(b) by 0 days.

(21) Appl. No.: 09/113,036

(22) Filed: Jul. 9, 1998

(51) Int. Cl.$^7$ ................................................ H04B 10/00
(52) U.S. Cl. ................................... 359/152; 359/163
(58) Field of Search ........................... 359/152, 143, 359/163, 172; 340/825.72

(56) References Cited

U.S. PATENT DOCUMENTS

| | | | |
|---|---|---|---|
| 4,279,465 | 7/1981 | Vojvodich | 350/96.2 |
| 4,989,934 * | 2/1991 | Zavracky et al. | 359/152 |
| 5,122,893 * | 6/1992 | Tolbert | 359/152 |
| 5,280,184 * | 1/1994 | Jokerst et al. | 359/163 |
| 5,382,810 | 1/1995 | Isaksson | 257/81 |
| 5,506,445 | 4/1996 | Rosenberg | 257/666 |
| 5,585,953 | 12/1996 | Zavrel | 359/152 |
| 5,753,928 | 5/1998 | Krause | 250/551 |
| 5,903,374 * | 5/1999 | Kobayashi | 359/152 |
| 6,169,295 | 1/2001 | Koo | 257/81 |

FOREIGN PATENT DOCUMENTS

| | | | |
|---|---|---|---|
| 1466486 | 3/1977 | (GB) | H04B/9/00 |
| 2326786 | 12/1998 | (GB) | H04B/10/02 |
| 9956417 | 11/1999 | (WO) | H04B/10/22 |
| 9962121 | 12/1999 | (WO) | H01L/27/15 |

* cited by examiner

Primary Examiner—Kinfe-Michael Negash
(74) Attorney, Agent, or Firm—Steins & Associates (57) ABSTRACT

An Improved Optics System for Infrared Signal Transceivers is disclosed. Transceivers. The preferred system includes an IR transceiver assembly that is easily grasped by assemblers. Furthermore, the primary and secondary lenses associated with the transceiver system are easier to manufacture than current lens designs. Also, the heretofore critical lens separation between the emitter/detector devices and the primary lens is rendered a flexible dimension, dependent only upon the particular appliance in which the system is installed. The present invention permits the stand for emitter/detector devices to be eliminated as a result of exchanging a non-imaging transceiver system with the current imaging transceiver system. Finally, the present invention comprises assembling or otherwise combining emitter/detector devices into a single emitter/detector device stack.

10 Claims, 8 Drawing Sheets

OPTICS SYSTEM FOR INFRARED SIGNAL TRANSCEIVERS

BACKGROUND OF THE INVENTION

1. Field of the Invention

This invention relates generally to infrared communications systems and, more specifically, to an Improved Optics System for Infrared Signal Transceivers.

2. Description of Related Art

As technology becomes continually more accessible to the "common man," the ability to use, store, transfer and otherwise manipulate information has become the focus of most businesses as well as for the individual consumer. Access to the information resources is commonly by some sort of network system, including World Wide Web, "Intranets", local area networks, wide area networks, as well as corporate databases.

While the conventional method for connecting to one of these information networks has been via cable and wire, as the reliance upon connectivity to information has deepened, the desire to gain such access from mobile or portable devices has strengthened. These portable devices, such as Personal Digital Assistants, handheld computers, and even cellular telephones are now being connected to each other and to networks via Infrared Data Communications. In fact, it is virtually impossible to purchase a notebook computer today that does not include an Infrared Data Communications assembly resident within it.

Figure 1:
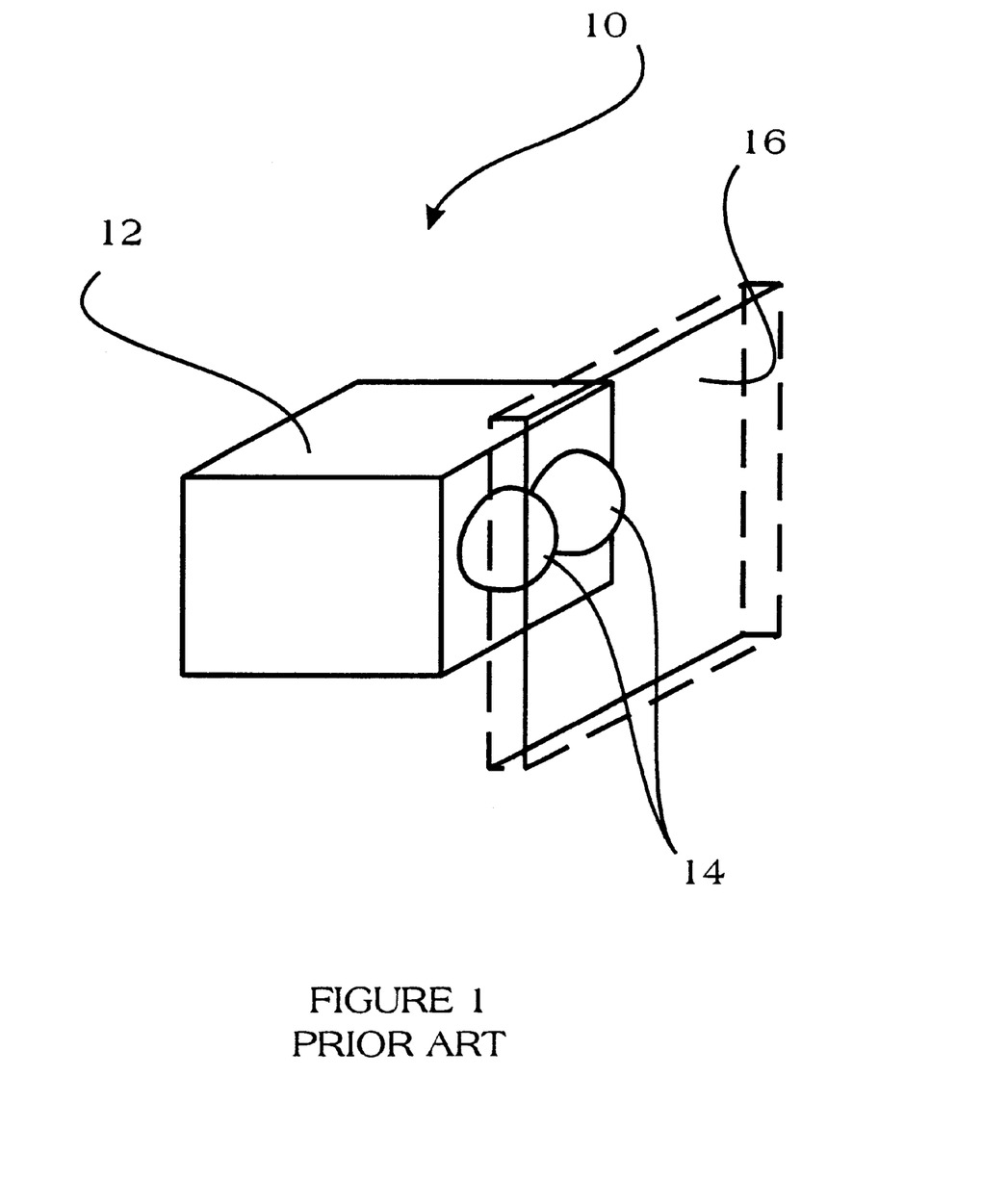
FIG. 1 is a perspective view of a prior infrared transceiver assembly.
Figure 2:
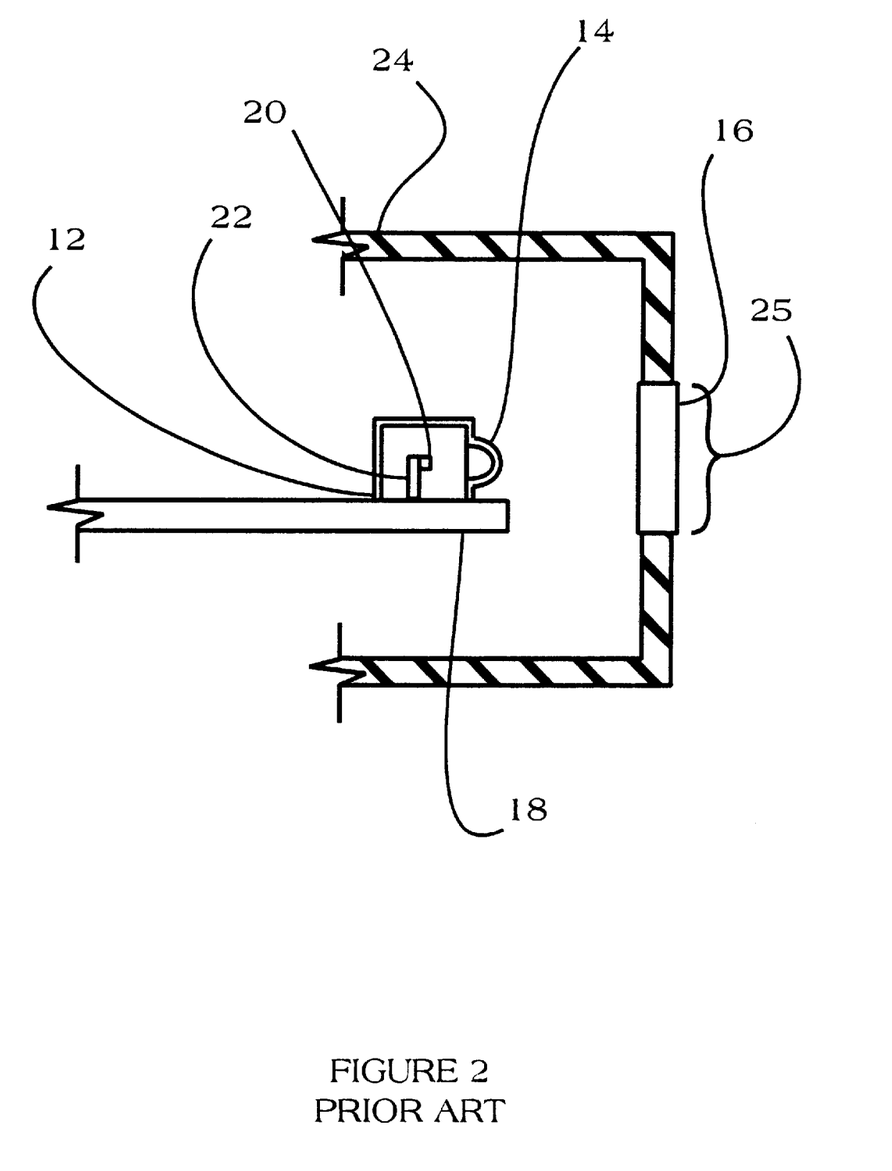
FIG. 2 is a cutaway side view of the prior infrared transceiver assembly of FIG. 1.

FIG. 1 depicts the typical infrared data communications hardware that is installed in electronic devices; it is a perspective view of a prior infrared transceiver assembly 10. As discussed above, these assemblies 10 are found in virtually every notebook computer sold today. The components of the assembly 10 are virtually identical across all manufacturers' product lines, with few exceptions. The typical assembly 10 comprises a housing 12 within which the infrared emitter and detector (see FIG. 2) are mounted. The "transceiver" is actually data processing circuitry for managing the emitter and detector; it's location is therefore not optically-dependent (and, in fact, it operates better in "IR darkness"). The housing 12 usually is molded from plastic, with a primary lens unit 14 formed in one of the sides of the housing 12. As can be seen, the conventional primary lens unit 14 comprises two lenses; one each for the emitter and detector (both lenses with similar optical properties, and both requiring precision and reproducibility). Adjacent to the housing 12, is a protective lens 16. The protective lens 16 is generally constructed from a colored plastic that is transparent to infrared signals. In most cases, the protective lens 16 is attached to the external case of the electronic device, its purpose being to protect the inner workings of the device, while also permitting infrared signals to pass in and out. FIG. 2 gives further detail regarding the workings of the prior assembly 10.

FIG. 2 is a cutaway side view of the prior infrared transceiver assembly 10 of FIG. 1. As can be seen, the housing 12 is generally attached to the "motherboard" 18 or other printed circuit board within the electronic device. Within the housing 12 is located an emitter/detector pair 20. It should be understood that it is also common to place more than a single emitter and/or detector inside of one housing 12 (e.g. two emitters and one detector, etc.); an emitter/detector pair 20 is used here simply in the interest of brevity.

The emitter/detector pair 20 transmit and receive infrared signals. The emitter/detector pair 20 is typically mounted to a stand 22, and thereby positioned in the signal path of the lens 14 in order to send and receive infrared signals therethrough. As discussed earlier, the appliance case 24 has an aperture 25 formed therein, and into which a protective lens 16 is installed. The protective lens 16 simply protects the inner workings of the appliance from contamination.

This prior assembly 10 has several deficiencies. First, the protrusion of the primary lens unit 14 can make the housing 12 difficult to grasp by humans and/or machines assembling the electronic devices. The difficulty in grasping can result in manufacturing defects, production delays, and generally higher costs of production. What is needed is a primary lens unit design that does not present a grasping difficulty to assemblers.

Second, the primary lens unit 14 mandates higher manufacturing and design standards than the average plastic housing for an electronic device to insure that the light-refractive traits of the lens 14 are predictable and repeatable. Because the primary lens unit 14 is integral to the housing 12, the entire housing 12 becomes subject to the elevated quality standards. It would be much more cost-effective if the design of the integral primary lens unit 14 did not mandate elevated quality standards for the entire housing 12.

Figure 3:
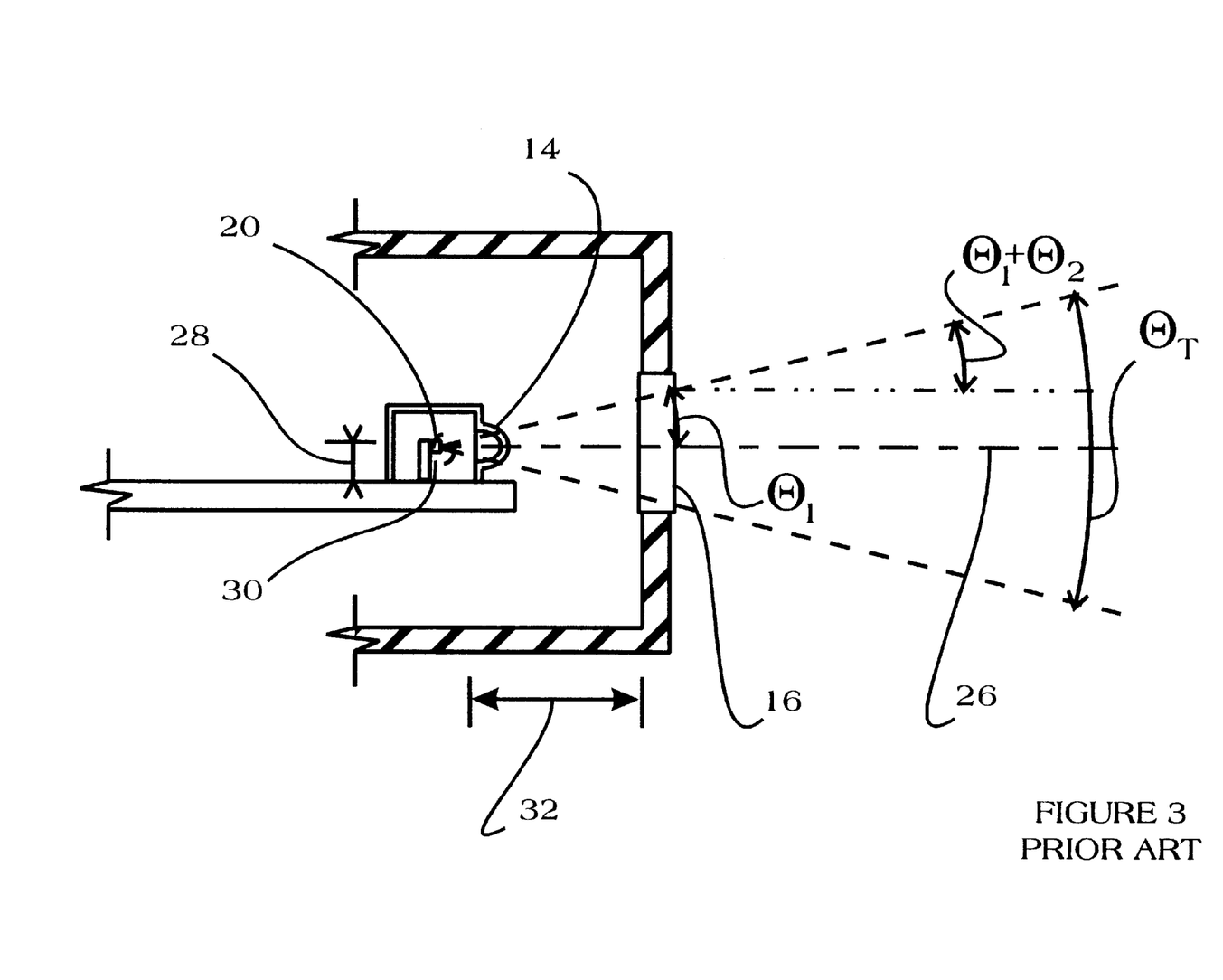
FIG. 3 is a cutaway side view of the transceiver assembly of FIGS. 1 and 2, depicting the typical transmit dispersion angle.

Other defects with the prior assembly 10 are illuminated by FIG. 3. FIG. 3 is a cutaway side view of the transceiver assembly 10 of FIGS. 1 and 2, depicting the typical transmit dispersion angle $\theta_T$ of the assembly 10. By current IrDA (Infrared Data Association) standards, the transmit dispersion angle $\theta_T$ must be at least 15 (fifteen) degrees from the focal axis 26 (in two dimensions, of course). The transmit dispersion angle $\theta_T$ is the sum-total of the primary lens refraction angle $\theta_1$ and the protective lens refraction angle $\theta_2$. All prior assemblies 10 include a protective lens 16 that has no refractive power; the protective lens refraction angle $\theta_2$ is, therefore, typically 0 degrees. Consequently, the conventional primary lens unit refraction angle $\theta_1$ is 15 (fifteen) degrees.

There are several design implications resulting from having the entire transmit dispersion angle $\theta_T$ provided by the primary lens unit 14. The emitter/detector pair 20 must be located at the focal point 30 of the primary lens unit 14 in order to insure that no signal data is lost. As such, the height 28 (as well as horizontal placement) of the emitter/detector pair 20 is very specifically defined. Moreover, the stand (see FIG. 2) must be included in order to raise the emitter/detector pair 20 above the printed circuit board 18. It would be a better arrangement if the emitter/detector pair 20 could be mounted directly to the printed circuit board 18. Furthermore, the separation 32 between the primary lens unit 14 and the protective lens 16 is very critical. Unless the primary lens unit 14 is very close to the protective lens 16, the protective lens 16 must be relatively large or else the mandated angular dispersion will not be met. A large protective lens 16 can be a serious design constraint for the smaller electronic devices, where component real estate is very tight. What would be better is a design that permits the protective lens 16 to be very small, allows the lens separation distance 32 to be flexible, and still meets the IrDA angular dispersion requirements.

SUMMARY OF THE INVENTION

In light of the aforementioned problems associated with the prior devices, it is an object of the present invention to provide an Improved Optics System for Infrared Signal Transceivers. It is a further object that the improved system include a IR transceiver assembly that is easily grasped by assemblers. It is also an object that the primary and secondary lenses associated with the transceiver system be easier to manufacture than current lens designs. It is a still further object that the heretofore critical lens separation between the emitter/detector devices and the primary lens become a flexible dimension, dependent only upon the particular appliance in which the system is installed. It is another object that the stand for emitter/detector devices be eliminated as a result of exchanging a non-imaging transceiver system with the current imaging transceiver system. Finally, it is an object that emitter/detector devices be assembled or otherwise combined into a single emitter/detector device stack.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an Improved Optics System for Infrared Signal Transceivers.

Figure 4:
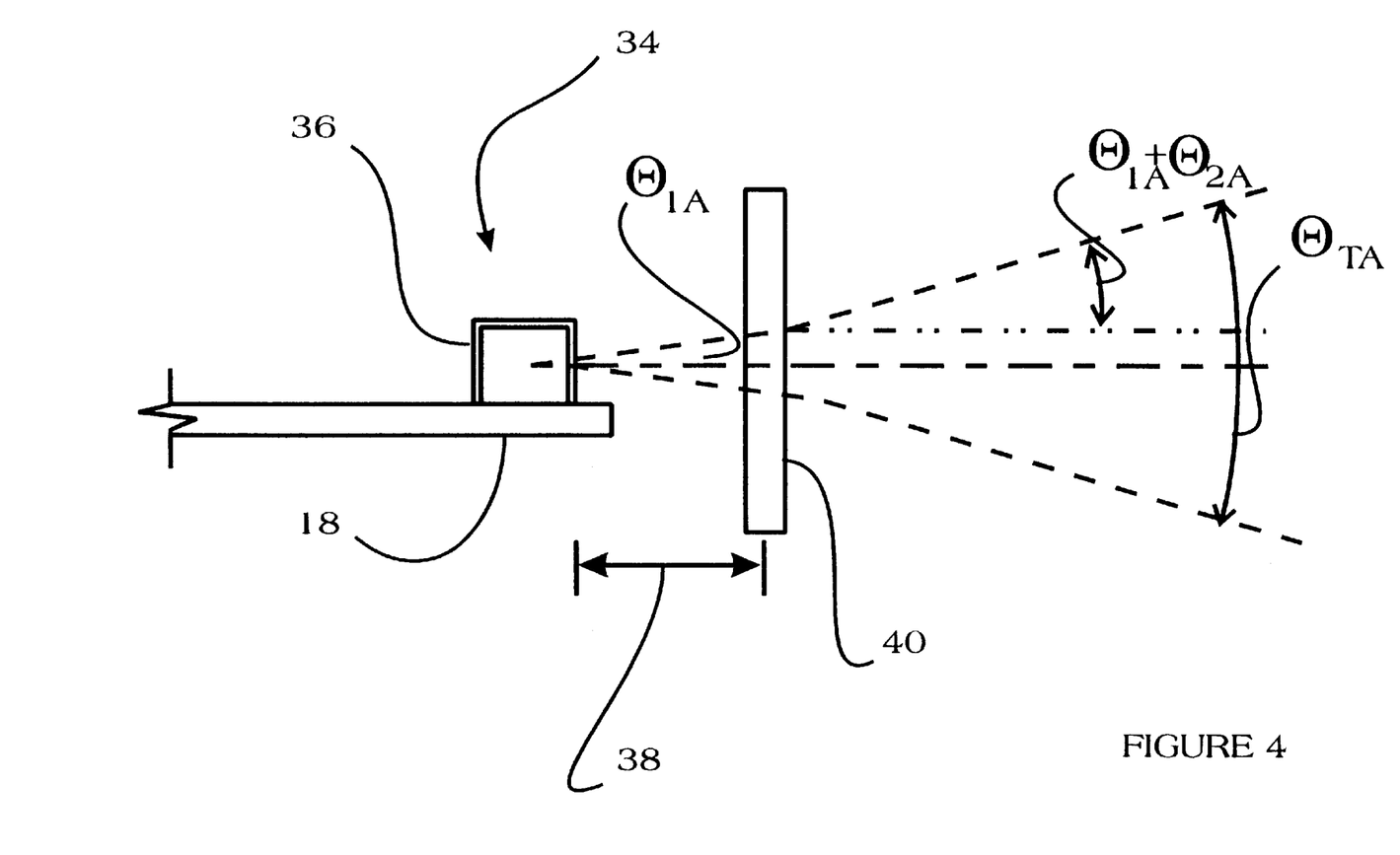
FIG. 4 is a cutaway side view of a preferred embodiment of the improved transceiver assembly of the present invention.

The present invention can best be understood by initial consideration of FIG. 4. FIG. 4 is a cutaway side view of a preferred embodiment of the improved transceiver assembly 34 of the present invention. Similar to the prior assemblies, this improved assembly comprises a housing 36 and a secondary lens 40, which are separated by a distance 38. What is unique about this particular assembly 34 is the optical characteristics of the secondary lens 40. Instead of simply being a protective cover for the electronics, this secondary lens 40 also has refractive characteristics. As such, the transmit dispersion angle $\theta_{TA}$ of this preferred assembly 34 is equal to the primary lens unit refraction angle $\theta_{1A}$ plus the additional secondary lens refraction angle $\theta_{2A}$. In this new arrangement, therefore, a much wider field of transmission is possible, because the transmit dispersion angle $\theta_{TA}$ can be increased to well beyond the standard fifteen degrees. Furthermore, the secondary lens 40 can be exchangeable with other secondary lenses having different optical characteristics. In this manner, a limitless variety of dispersion angles $\theta_{TA}$ can be achieved for a single piece of equipment.

Figure 5:
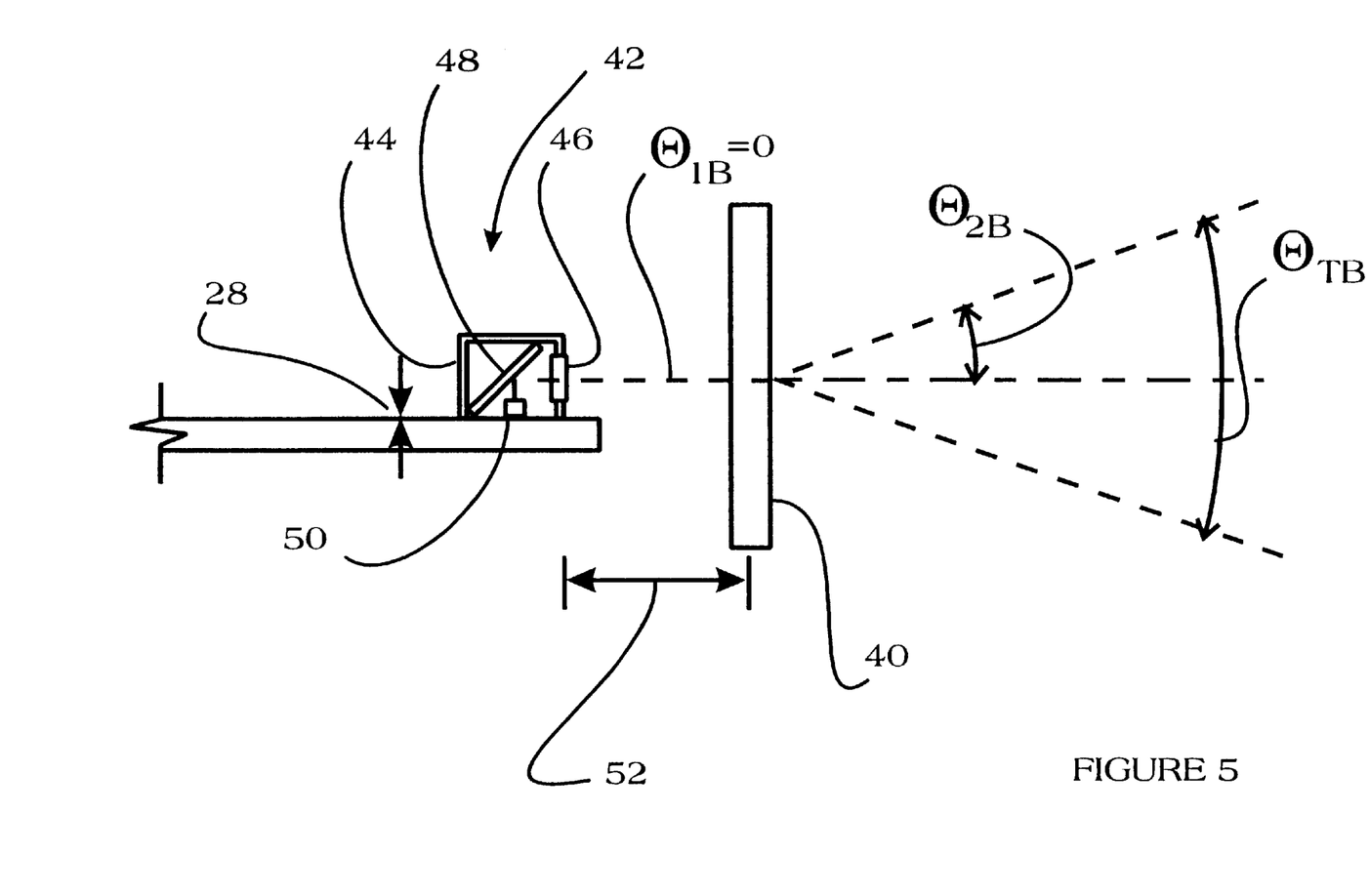
FIG. 5 is a cutaway side view of another preferred embodiment of the improved transceiver assembly of the present invention.

Now turning to FIG. 5, we might further explore the implications and benefits of the new design. FIG. 5 is a cutaway side view of another preferred embodiment of the improved transceiver assembly 42 of the present invention. Similar to the assembly 34 of FIG. 4, this assembly 42 comprises a secondary lens 40 that has refractive power. In this present embodiment, however, the primary lens unit 46 has no refractive power (i.e. $\theta_{1B}=0$ degrees). As such, the entire transmit dispersion angle $\theta_{TB}$ is determined by the contributions from the secondary lens 40; no redirection of the light occurs as it passes through the primary lens unit 46.

Because there is no redirection of the light by the primary lens unit 46, the lens separation distance 52 ceases to be determined by the size of the aperture (see FIG. 2) and secondary lens 40. This provides a significant advantage over the prior assemblies because the housing 44 can be placed in a location on the PC board that is convenient to the PC board layout, without the concern for its distance from the case (and the secondary lens 40).

Furthermore, there are other benefits to this new design. Since there is no focussing of the light by the primary lens unit 46, there is no focal point for the light. The conventional emitter/detector pair 20 can be replaced with "non-imaging" emitter/detector pair 50 that is not dependent upon a focal point. "Non-imaging" detectors simply detect any (and all) incident infrared light—they are commonly less expensive than the "imaging" detectors in use by conventional IR transceiver assemblies. The incident (and transmitted) light may simply be redirected by a mirror 48 and down to (or out from) the emitter/detector pair 50. Because there is no longer a focal point to deal with, the location of the emitter/detector pair 50 is very flexible. In fact, it would be natural to mount the emitter/detector pair 50 directly onto the PC board, with the emitter/detector height 28 being effectively zero. This means that the emitter/detector pair 50 can be mounted easily by conventional PC board assembly processes—the housing might actually be added on later. Consequently, the manufacturing costs attributable to the IR transceiver assembly 42 are substantially reduced.

Figure 6:
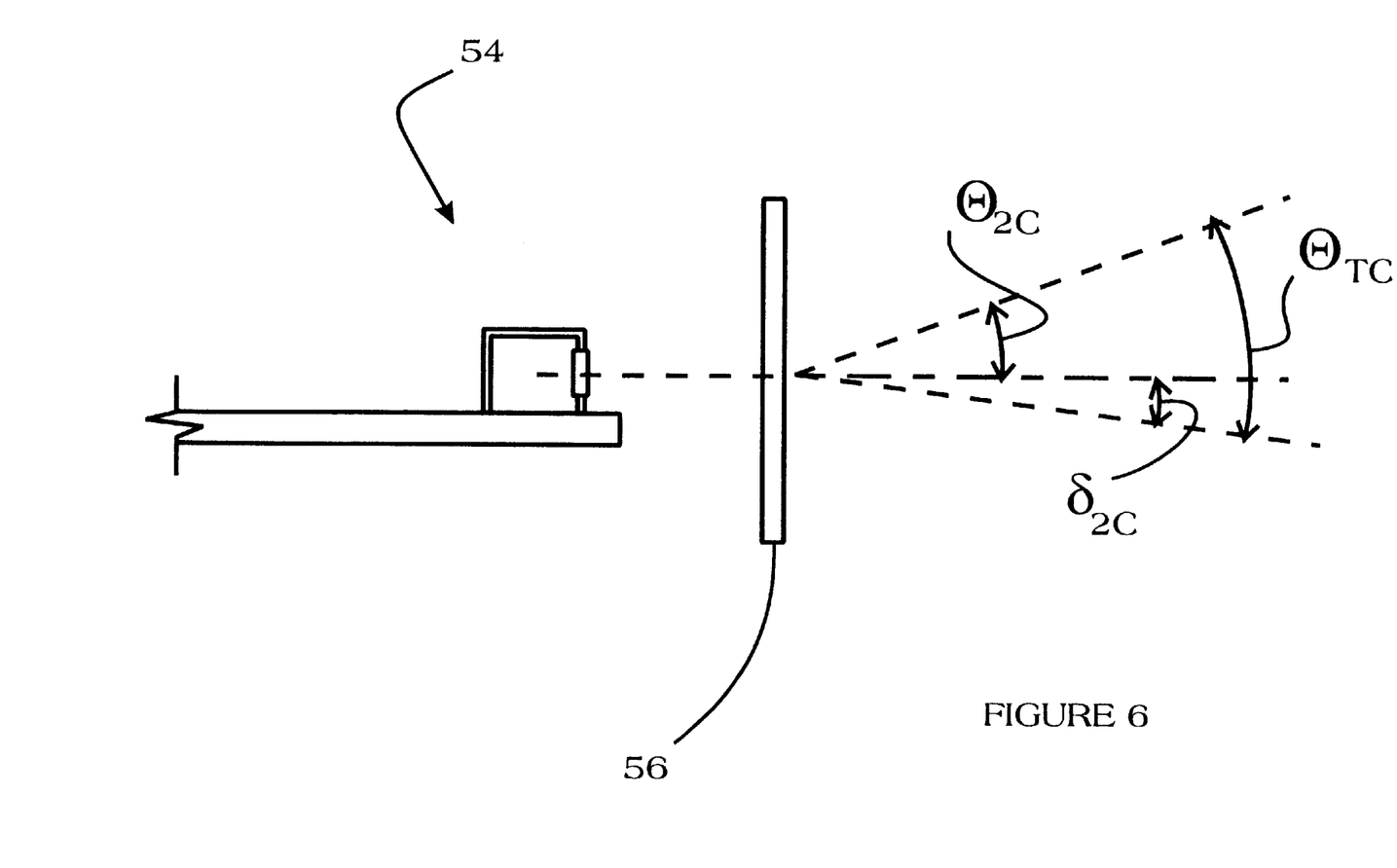
FIG. 6 is a partial cutaway side view of yet another preferred feature of the improved transceiver assembly of the present invention.
Figure 7:
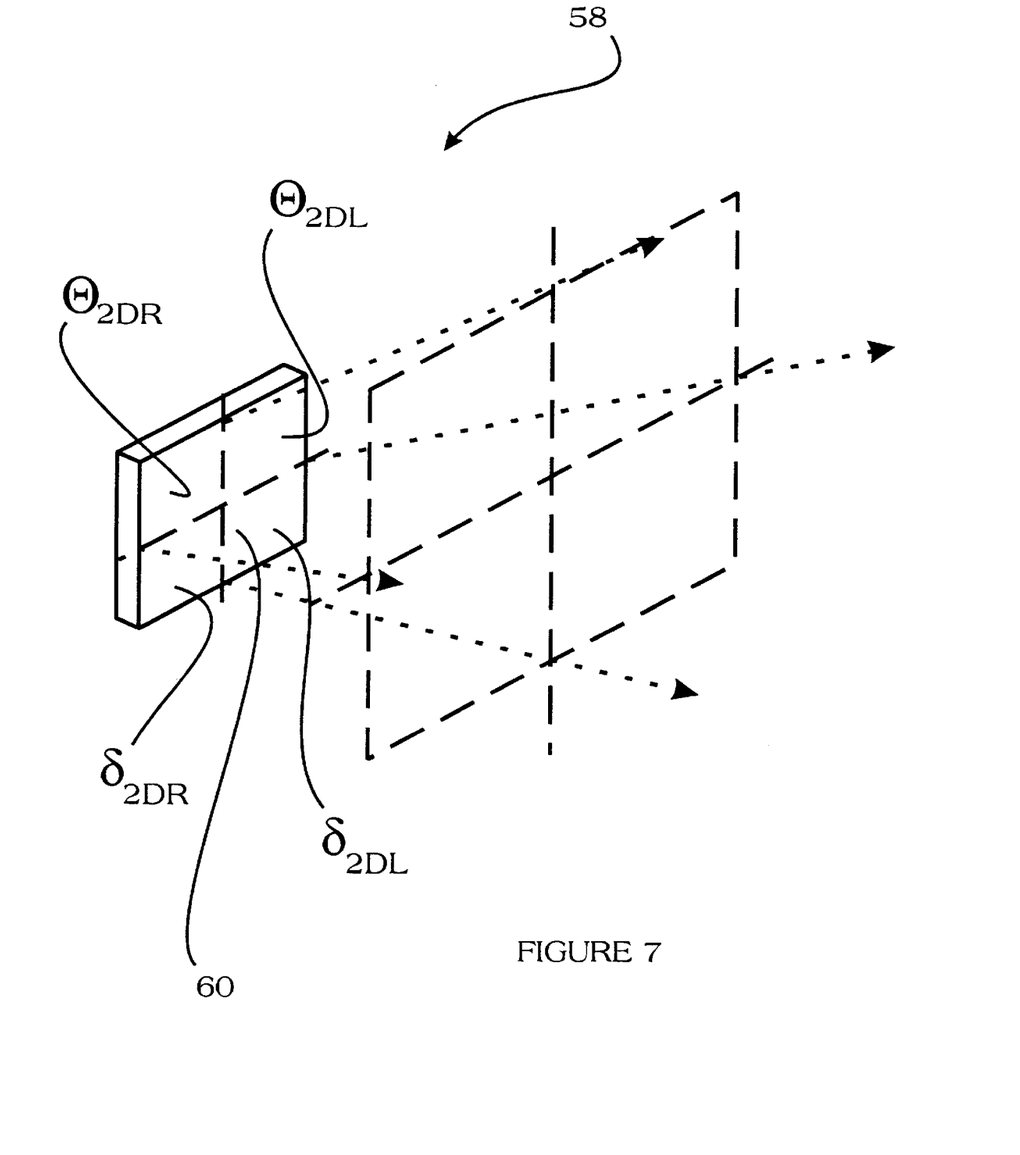
FIG. 7 is a partial perspective view of still another preferred embodiment of the present invention.

In another series of embodiments, there may be different dispersion angles for different regions of the secondary lens 56. An example is provided in FIG. 6, which is a partial cutaway side view of yet another preferred embodiment of the improved transceiver assembly 54 of the present invention. In this Figure, the transmit dispersion angle $\theta_{TC}$ is equal to the total of the secondary lens upper region refraction angle $\theta_{2C}$ and the secondary lens lower region refraction angle $\phi_{2C}$. As can be seen, these two regions have different refracting characteristics. It should be appreciated that a virtually limitless set of combinations of different refracting regions may be desired. FIG. 7 is a partial perspective view of still another preferred embodiment of the infrared transceiver assembly 58 of the present invention. In this embodiment, the secondary lens 60 is divided into four regions, each having unique refractive characteristics, as indicated by the upper left refraction angle $\theta_{2DL}$, the upper right refraction angle $\theta_{2DR}$, the lower left refraction angle $\phi_{2DL}$, and the lower right refraction angle $\phi_{2DR}$. Again, it should be apparent that this is simply one design example; a wide variety of regions and refraction characteristics is expected.

It is also possible that a secondary lens employing shiftable and/or variable refracting regions is currently available, such as via Liquid Crystal technology. Furthermore, the secondary lens might be configured to mask out certain regions by being selectively opaque to infrared signal transmission. Each of these features is an significant advancement over the prior devices.

Figure 8:
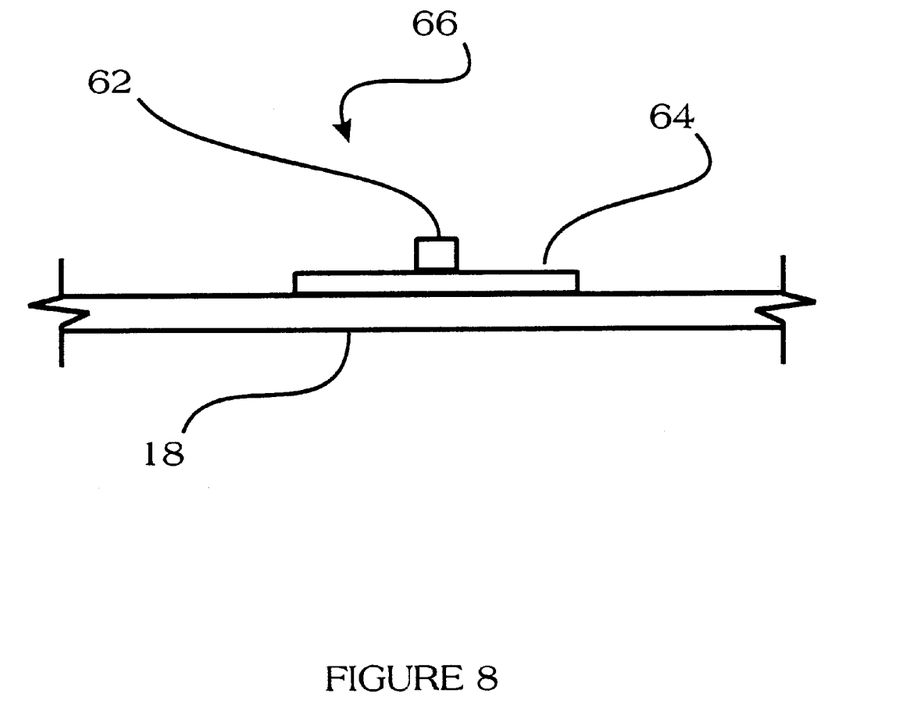
FIG. 8 is a partial cutaway side view of an integrated emitter/detector device stack of the present invention.

Another significant advancement of the present invention involves assembling or otherwise combining the emitter/detector pair into a single, integrated emitter/detector device stack 66, as depicted by FIG. 8. The emitter is much smaller than the detector (0.3 $mm^2$ vs. 1.8 $mm^2$ conventionally); furthermore, the emitter circuitry is conventionally built upon a transparent substrate. It is an aspect of the present invention that the emitter 62 be placed directly on top of the detector 64 (i.e. in the path of incident and exiting IR signals) to form an integrated emitter/detector device 66. This was very difficult under prior transceiver assembly designs, because the emitter and detector would most likely have different focal points. Under the improvement described previously herein, however, the focal point of the primary lens unit is no longer an issue.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An improved transceiver system for sending and receiving infrared signals, comprising:

a housing further defined by a substantially transparent aperture, said aperture including a primary lens unit inserted into said aperture, and said primary lens unit further defining a primary refractive power to refract said signals by a primary refraction angle;

at least one emitter located within said housing adjacent to said aperture;

at least one detector also located within said housing adjacent to said aperture; and a secondary lens located adjacent to said aperture, said secondary lens defining a secondary refractive power to refract said signals by a secondary refraction angle, said secondary refraction angle being greater than zero degrees, wherein said secondary lens further comprises a tertiary refractive power to refract said signals by a tertiary refraction angle, said tertiary refraction angle being greater than or less than said secondary refraction angle;

whereby said system defines a total refraction angle of refraction of said signals, said total refraction angle consisting of the primary refraction angle plus the secondary refraction angle.

2. The system of claim 1, wherein said secondary lens defines a variably adjustable secondary refractive power.

3. The system of claim 1, wherein said secondary lens defines a window through which signals pass, and wherein portions of said windows are selectably opaque.

4. The system of claim 1, wherein said secondary lens defines a window, defined by at least two window portions, through which said signals pass, and wherein each said window portion may define refractive powers that differ from another said window portion.

5. An improved process for transmitting and receiving infrared signals, comprising:

refracting said signals by a primary refraction angle by passing said signals through a primary refracting means;

refracting said signals by a secondary refraction angle by passing said signals through a secondary refacting means, said two refractings being additively applied to the same transmitted or received signal, wherein said second refracting further comprises a secondary refraction angle of greater than zero degrees, and a tertiary refraction angle of greater than zero degrees.

6. The process of claim 5, wherein said first refracting comprises a primary refraction angle of less than five degrees.

7. The process of claim 5, wherein said first refracting comprises a primary refraction angle of zero degrees.

8. The process of claim 5, wherein said second refracting comprises a variably adjustable secondary refraction angle.

9. In an infrared transceiver assembly comprising at least one emitter and at least one detector, a housing comprising a light-refracting primary lens unit and a non-light-refracting secondary lens whereby all transmitted and received infrared signals pass through both said primary lens unit and said secondary lens, the improvement comprising the steps of:

exchanging said non-light-refracting secondary lens with a light-refracting secondary lens;

exchanging said light-refracting primary lens unit with a non-light-refracting primary lens unit, wherein said secondary light exchanging comprises the use of a secondary lens having variably adjustable light-refracting characteristics.

10. The improvement of claim 3, further comprising the step of exchanging said emitters and said detectors with an integrated emitter/detector device stack.

* * * * *